(12) United States Patent
Chan et al.

(10) Patent No.: US 11,237,523 B2
(45) Date of Patent: Feb. 1, 2022

(54) WATCH WITH GEOMETRIC CODES

(71) Applicant: Pengelly Co. Ltd., Kwai Chung (HK)

(72) Inventors: Kwan Wa Chan, Kwai Chung (HK); Yat Sang Chow, Kwai Chung (HK)

(73) Assignee: PENGELLY CO. LTD., Hong Kong (HK)

( * ) Notice: Subject to any disclaimer, the term of this patent is extended or adjusted under 35 U.S.C. 154(b) by 124 days.

(21) Appl. No.: 16/615,541

(22) PCT Filed: Jul. 4, 2019

(86) PCT No.: PCT/IB2019/055709
§ 371 (c)(1),
(2) Date: Nov. 21, 2019

(87) PCT Pub. No.: WO2020/008405
PCT Pub. Date: Jan. 9, 2020

(65) Prior Publication Data
US 2020/0264563 A1    Aug. 20, 2020

Related U.S. Application Data

(60) Provisional application No. 62/694,616, filed on Jul. 6, 2018.

(30) Foreign Application Priority Data

Sep. 26, 2018  (HK) .................. 18112357.2

(51) Int. Cl.
*G06F 17/00* (2019.01)
*G06K 7/10* (2006.01)
(Continued)

(52) U.S. Cl.
CPC ........... *G04B 19/10* (2013.01); *G06K 7/1408* (2013.01); *G06Q 20/321* (2020.05)

(58) Field of Classification Search
CPC ...... G04B 19/10; G04B 45/02; G06Q 20/321; G06K 7/1408
See application file for complete search history.

(56) References Cited

U.S. PATENT DOCUMENTS 6,998,984 B1 * 2/2006 Zittrain ............... G08B 3/1066
340/539.11
10,534,320 B2 * 1/2020 Ferri .................... G04B 27/002
(Continued)

FOREIGN PATENT DOCUMENTS

CH     700261 A2 * 7/2010 ............. G04B 19/16
CN  101452254 A    6/2009
(Continued)

OTHER PUBLICATIONS

CH700261A2, Wild Daniel, Timepiece i.e. pocketwatch or wristwatch, Jul. 30, 2010, English machine translation, pp. 1-15 (Year: 2010).*

(Continued)

*Primary Examiner* — Tuyen K Vo
(74) *Attorney, Agent, or Firm* — Muncy, Geissler, Olds & Lowe, P.C.

(57) ABSTRACT

The present invention provides a watch including a movement, a case housing the movement and an adjustable dial above the movement. The adjustable dial shows different patterns by adjustments. The adjustable dial includes an upper dial and a lower dial. The appearance of the watch can be adjusted due to different preferences and different occasions. By combining with the recognition technology, the watch of the present invention can be used as an encoder in a security system.

22 Claims, 10 Drawing Sheets

(51) Int. Cl.
*G04B 19/10* (2006.01)
*G06Q 20/32* (2012.01)
*G06K 7/14* (2006.01)

(56) References Cited

U.S. PATENT DOCUMENTS

| | | | | |
|---|---|---|---|---|
| 2004/0090872 | A1* | 5/2004 | Schmiedchen | G04B 23/021 368/203 |
| 2005/0111303 | A1* | 5/2005 | Willemin | G04B 19/25 368/28 |
| 2005/0162985 | A1* | 7/2005 | Speichinger | G04B 3/041 368/319 |
| 2006/0007787 | A1* | 1/2006 | Born | G04B 19/268 368/15 |
| 2007/0008824 | A1* | 1/2007 | Cretin | G04F 7/0861 368/69 |
| 2011/0069590 | A1* | 3/2011 | Jolidon | G04B 47/042 368/15 |
| 2012/0257480 | A1* | 10/2012 | Girardbille | G04F 7/0857 368/80 |
| 2013/0051192 | A1* | 2/2013 | Oshio | G04B 19/065 368/205 |
| 2014/0003198 | A1* | 1/2014 | Vuilleumier | G04B 19/22 368/22 |
| 2014/0226445 | A1* | 8/2014 | Dordor | G04C 17/0058 368/11 |
| 2015/0371215 | A1* | 12/2015 | Zhou | G06Q 20/384 705/71 |

FOREIGN PATENT DOCUMENTS

| | | | |
|---|---|---|---|
| CN | 204331293 U | | 5/2015 |
| CN | 107957673 A | * | 4/2018 |
| CN | 207502931 U | | 6/2018 |
| JP | S5481871 A | | 6/1979 |
| WO | WO9824004 A1 | | 6/1998 |

OTHER PUBLICATIONS

CN107957673A, Yu Wei, Watch with diversified decorative, Apr. 24, 2018, English machine translation, pp. 1-4 (Year: 2018).*

* cited by examiner

WATCH WITH GEOMETRIC CODES

FIELD OF INVENTION

The present invention relates to a watch, and in particular to a watch with geometric codes.

BACKGROUND

Watches are common accessories nowadays. The functions of watches have been standardized. Mechanical watches are limited to show time and date without other function. For digital watches, timer, alarm, and GPS functions are added. However, the appearance of traditional watches is fixed and no security feature has been introduced thereinto.

SUMMARY OF INVENTION

In light of the foregoing background, the present invention provides a watch comprising a movement, a case housing the movement and an adjustable dial above the movement; wherein the adjustable dial shows different patterns by adjustments.

In one embodiment, the adjustable dial comprises an upper dial and a lower dial.

In another embodiment, the watch further comprises a dial crown for adjusting the upper dial and the lower dial.

In a further embodiment, the outer circumferences of both the upper dial and the lower dial comprise bottom teeth facing downward. The dial crown comprises a driving wheel having teeth matching with the bottom teeth of the upper dial and the lower dial.

In a further embodiment, the upper dial has a larger diameter than the lower dial. The upper dial covers above the lower dial. The bottom teeth of the upper dial and the bottom teeth of the lower dial are at a same horizontal line.

In yet another embodiment, the teeth of the driving wheel of the dial crown are meshed with the bottom teeth of the lower dial when pushing in the dial crown. The teeth of the driving wheel of the dial crown are meshed with the bottom teeth of the upper dial when pulling out the dial crown.

In a further embodiment, the case comprises a groove for accommodating the bottom teeth of the upper dial and the lower dial. The groove acts as a rotation orbit of the upper dial and the lower dial.

In a further embodiment, the upper dial and lower dial are hollow with patterns occupying half of the hollow area.

In a further embodiment, the watch further comprises a top ring pin with graphic thereon. The top ring pin is adjustable by twisting. Combination of the top ring pin and the adjustable dial forms different patterns by adjustment.

In a further embodiment, the outer circumferences of both the upper dial and the lower dial comprise side teeth. The outer circumference of the lower dial further comprises bottom teeth facing downward. The dial crown comprises a driving wheel having teeth matching with the bottom teeth of the lower dial.

In a further embodiment, the watch further comprises a side wheel and a double layer wheel. The side wheel has teeth matching with the side teeth of the lower dial. The double layer wheel has lower teeth matching with the teeth of the side wheel and upper teeth matching with the side teeth of the upper dial.

In a further embodiment, the driving teeth of the dial crown are meshed with the bottom teeth of the lower dial. The teeth of the side wheel are meshed with the side teeth of the lower dial and the lower teeth of the double layer wheel. The upper teeth of the double layer wheel are meshed with the side teeth of the upper dial. Rotation of the dial crown drives the lower dial and the upper dial to rotate in opposite direction.

In a further embodiment, the case comprises a groove for accommodating the bottom teeth of the lower dial. The groove acts as a rotation orbit of the lower dial.

In a further embodiment, the adjustable dial comprises an upper layer and a lower layer. The upper layer comprises a plurality of gears. The lower layer comprises a frame for supporting the plurality of gears.

In a further embodiment, the watch further comprises a pusher with side teeth meshed with one gear of the plurality of gears, wherein the plurality of gears mesh with each other linearly. Each gear comprises a graphic thereon. Pushing of the pusher drives all the gear to rotate linearly, whereby showing different patterns.

In a further embodiment, the plurality of gears are of different sizes.

In another aspect, the present invention provides a security system using the aforesaid watch as an encoder, comprising a decoding device, wherein a specific pattern of the adjustable dial is set as a geometric code. The decoding device comprises a camera for recognizing the geometric code and performs subsequent actions upon recognition.

In a further embodiment, multiple specific patterns are set as geometric codes to be recognized by the decoding device.

In a further aspect, the present invention provides a security system using the aforesaid watch as an encoder, comprising a decoding device, wherein specific patterns of the adjustable dial act as primary codes while the graphic of the top ring pin acts as a secondary code. A specific combination of the primary code and the secondary code forms a recognizable code. The decoding device comprises a camera for recognizing the recognizable code and performs subsequent actions upon recognition.

In yet another embodiment, the subsequent actions comprises unlocking, payment and identification.

In a further embodiment, the decoding device is a smart phone, a payment device or an electronic door lock.

The present invention brings a new function into the traditional watch. The appearance of the watch can be adjusted due to different preferences and different occasions. Moreover, the present invention transforms the traditional watch into an encoder. By selecting a specific pattern as a geometric code, the watch can be used for unlocking, payment and identification when coupling with the latest recognition technology.

DETAILED DESCRIPTION OF PREFERRED EMBODIMENTS

Figure 1:
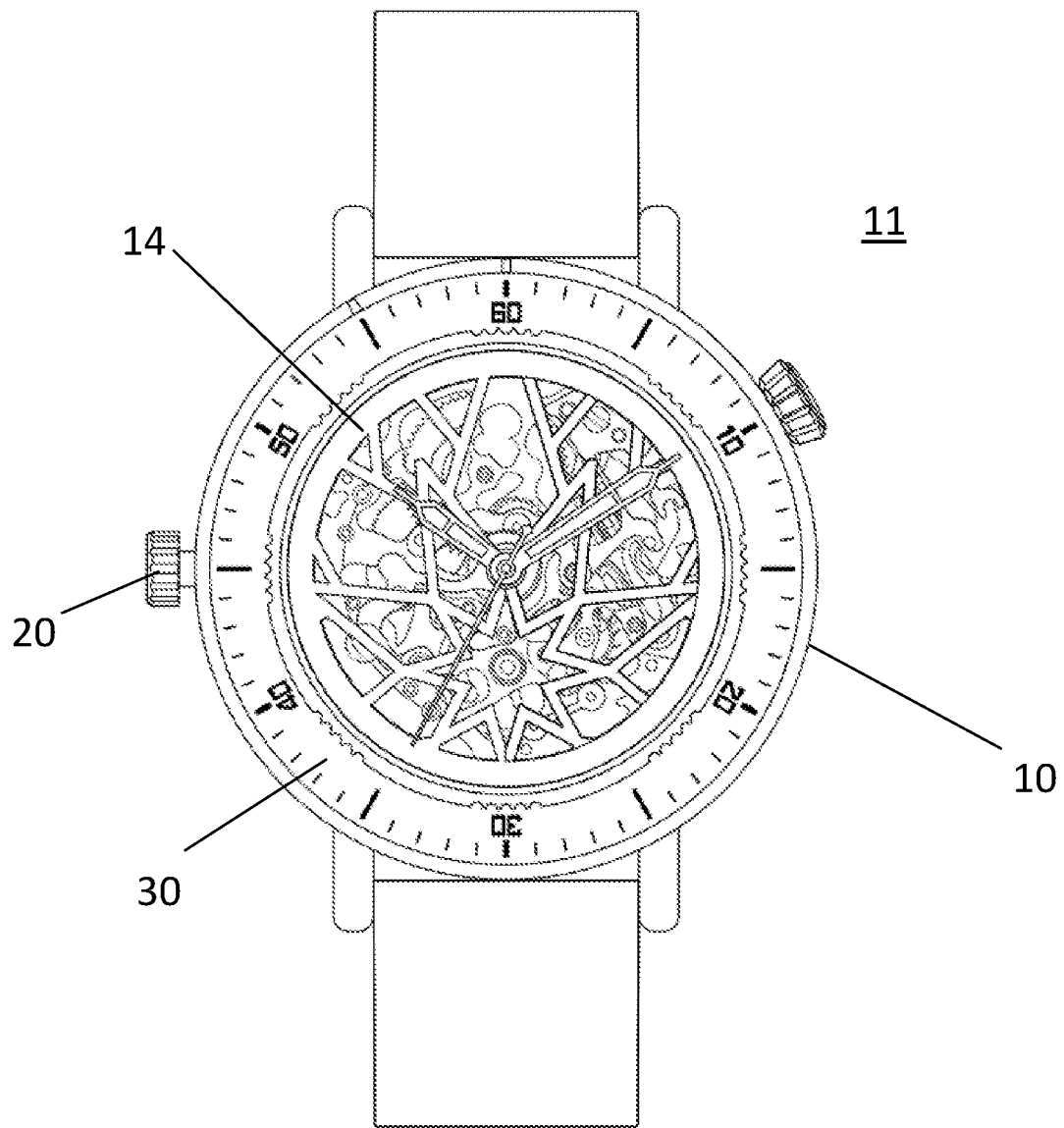
FIG. 1 is a watch in one embodiment of the present invention.
Figure 2:
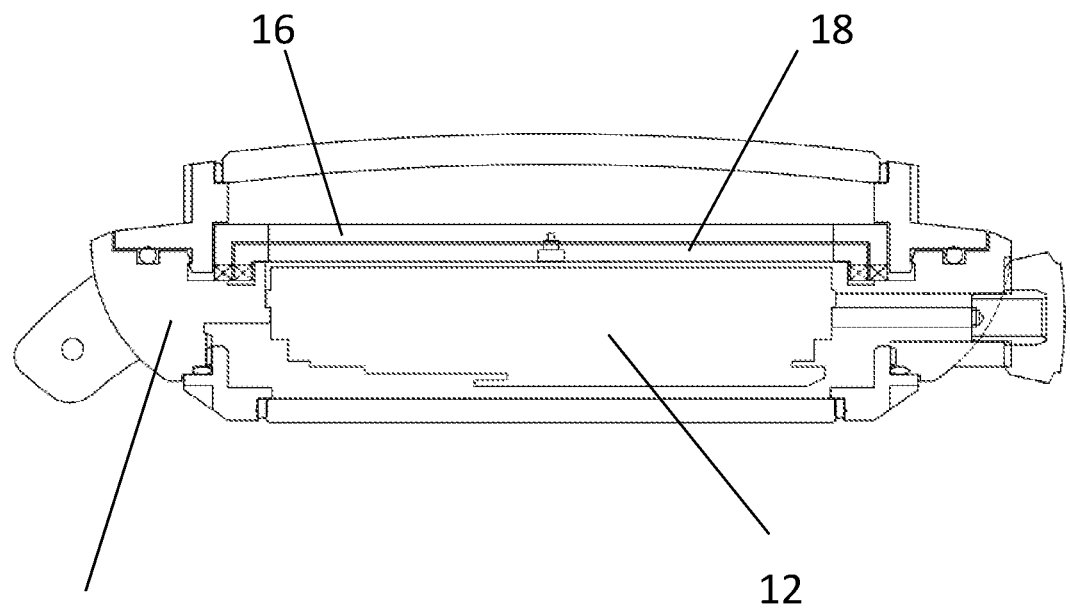
FIG. 2 is a cross sectional view of the watch in one embodiment of the present invention.

As shown in FIGS. 1 and 2, the watch 11 of the present invention comprises a case 10, a movement 12 and an adjustable dial 14. The movement 12 is housed inside the case 10. The adjustable dial 14 is mounted above the movement 12. The adjustable dial 14 comprises an upper dial 16 and a lower dial 18. The watch 11 further comprises a dial crown 20 for adjusting the upper dial 16 and the lower dial 18.

Figure 3:
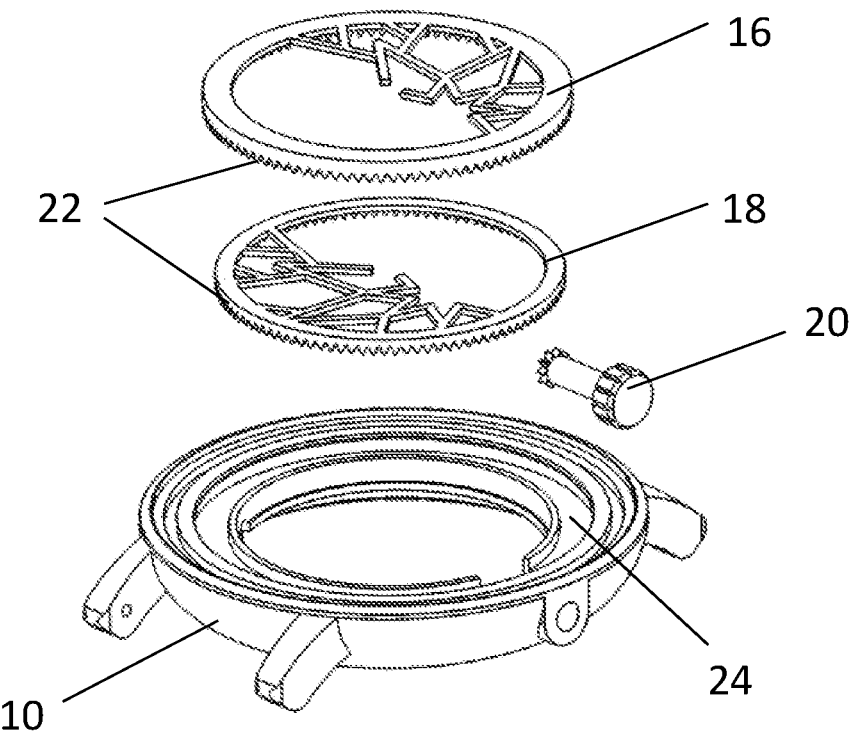
FIG. 3 is an exploded view of the case and the adjustable dial in one embodiment of the present invention.

FIG. 3 is an exploded view of the case 10 and the adjustable dial 14. The outer circumferences of both the upper dial 16 and the lower dial 18 comprise bottom teeth 22 facing downward, i.e. toward the movement 12. The upper dial 16 and the lower dial 18 are hollow with patterns occupying half of the hollow area. The case 10 comprises a groove 24 for accommodating the bottom teeth 22 of the upper dial 16 and the lower dial 18. The upper dial 16 has a larger diameter than the lower dial 18 so that the upper dial 16 can cover above the lower dial 18. Once the upper dial 16 and the lower dial 18 are stacked together, the bottom teeth 22 of the upper dial 16 and the lower dial 18 are at the same horizontal line.

Figure 4:
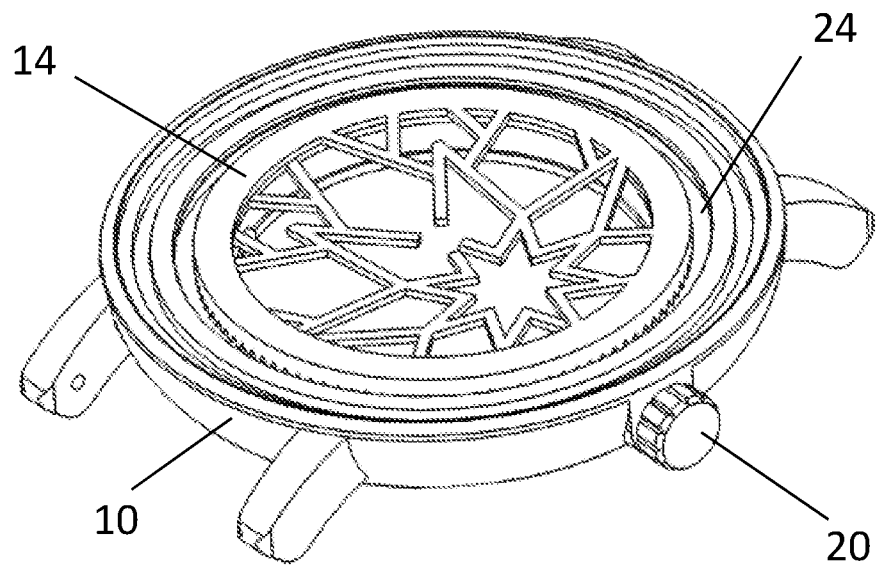
FIG. 4 shows the adjustable dial is mounted on the case in one embodiment of the present invention.
Figure 5:
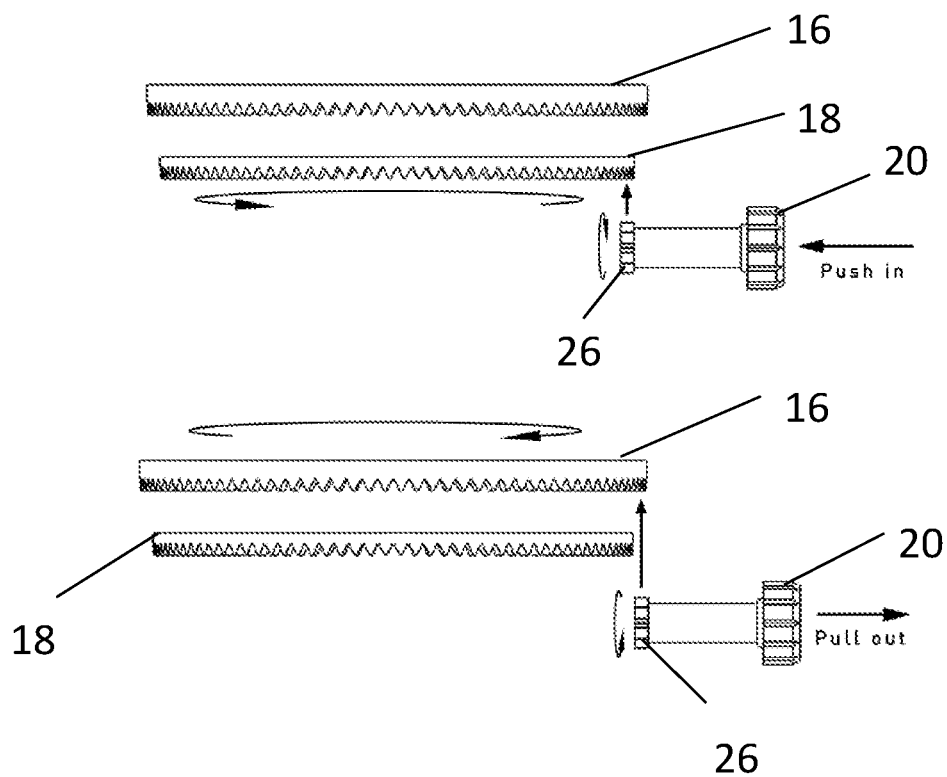
FIG. 5 is an exploded view of the upper dial, the lower dial and the dial crown in one embodiment of the present invention.

As shown in FIG. 4, when the adjustable dial 14 is mounted on the case 10, the groove 24 acts as a rotation orbit of the upper dial 16 and the lower dial 18. Referring to FIG. 5, the dial crown 20 comprises a driving wheel 26 having teeth matching with the bottom teeth 22 of the upper dial 16 and the lower dial 18. As the bottom teeth 22 of the upper dial 16 and the lower dial 18 are at the same horizontal line (not shown in FIG. 5), the teeth of the driving wheel 26 are meshed with the bottom teeth 22 of the lower dial 18 when pushing in the dial crown 20 while the teeth of the driving wheel 26 are meshed with the bottom teeth 22 of the upper dial 16 when pulling out the dial crown 20. By twisting the dial crown 20, the adjustable dial 14 shows different patterns so that the appearance of the watch 11 can be changed due to the user's preference. The pattern of the middle areas of the upper dial 16 and the lower dial 18 can be varied. It can be of any shape. In a preferred embodiment, it is of a twig-shape occupying half of the hollow area of the upper dial 16 and the lower dial 18.

Back to FIG. 1, the watch 11 further comprises a top ring pin 30 with graphic thereon. In this embodiment, the graphic is scale, i.e. 10, 20, 30, 40, 50 and 60. The top ring pin 30 is adjustable by twisting left or right. By adjusting the adjustable dial 14 and the top ring pin 30, the combination of the top ring pin 30 and the adjustable dial 14 forms different patterns.

Figure 6:
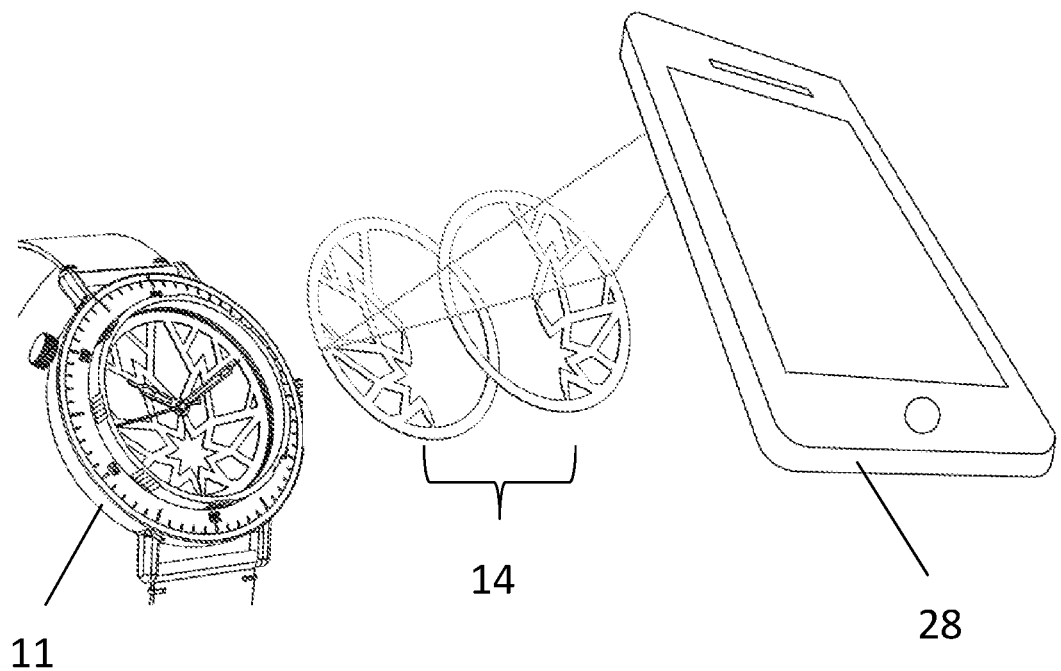
FIG. 6 is a security system in one embodiment of the present invention.

The adjustable dial 14 not only changes the appearance of the watch 11. By combining the recognition technology, it transforms the watch 11 into an encoder. In another aspect, the present invention provides a security system. As shown in FIG. 6, the security system comprises the watch 11 and a decoding device 28. The watch 11 acts as an encoder. A specific pattern of the adjustable dial 14 can be set as a geometric code by using the software installed on the decoding device 28. The decoding device 28 comprises a camera for recognizing the geometric code and it will perform subsequent actions upon recognition. The decoding device 28 comprises an interactive interface so that the users can capture a specific pattern of the adjustable dial 14 as a geometric code via the interactive interface. Based on needs and preference, the users can set multiple specific patterns as geometric codes to be recognized by the decoding device 28. Once the decoding device 28 recognizes a geometric code, it will perform a subsequent action such as unlocking, payment or identification, etc. If multiple geometric codes are used, each geometric code is associated with a specific action so that the users can perform the wanted action at different occasions. Based on different applications, the decoding device 28 can be a smart phone, a payment device or an electronic door lock. The security system of the present invention can be applied to any application that requires identification or the like.

Figure 7:
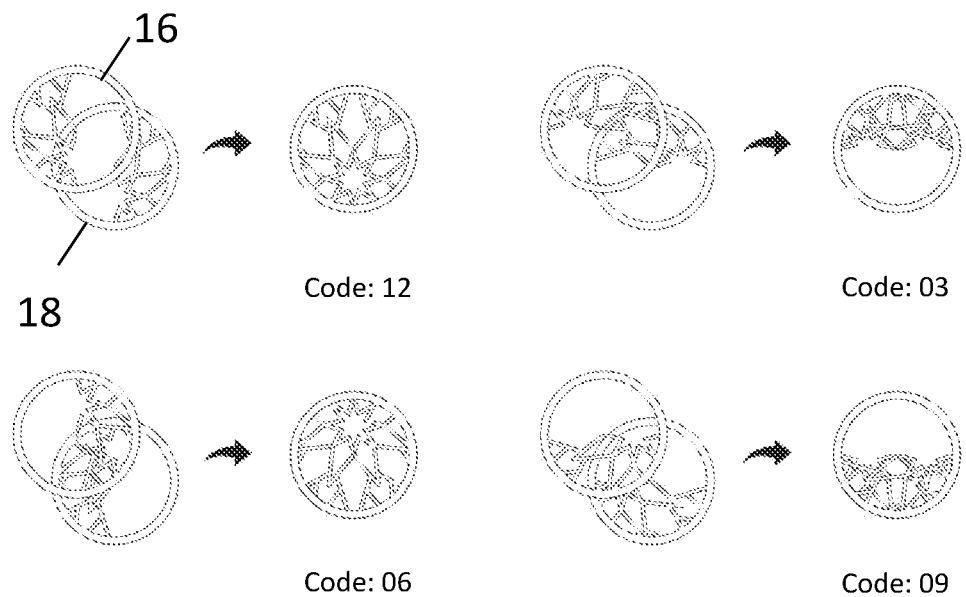
FIG. 7 is an exemplary diagram showing how a geometric code can be set in one embodiment of the present invention.

FIG. 7 is an example how the geometric code can be set. At the initial position, the upper dial 16 and the lower dial 18 form a complete pattern which can be set as a geometric code with code 12. By adjusting the dials, a half filled patent at the upper part can be set as a geometric code with code 03. What pattern to be set depends on the user's preference. Once a specific pattern is designed, the user can use the decoding device 28 to capture that pattern and store it as a geometric code in the decoding device 28. The subsequent action to be performed upon recognition of the geometric code can be also set by the user in the decoding device 28.

Figure 8:
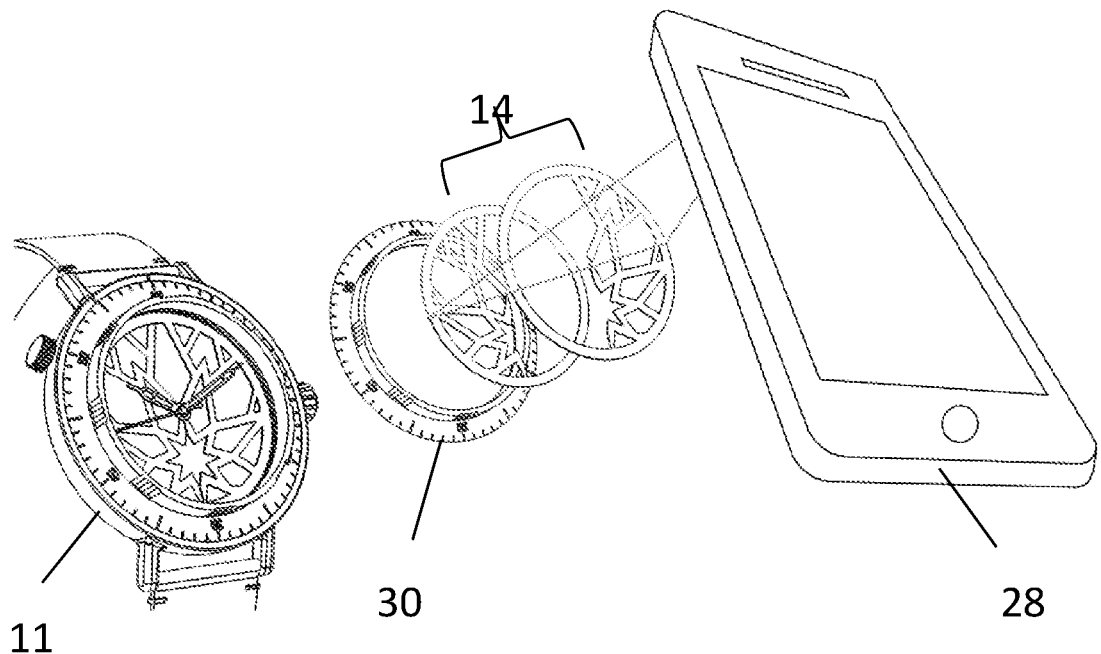
FIG. 8 is the security system in another embodiment of the present invention.
Figure 9:
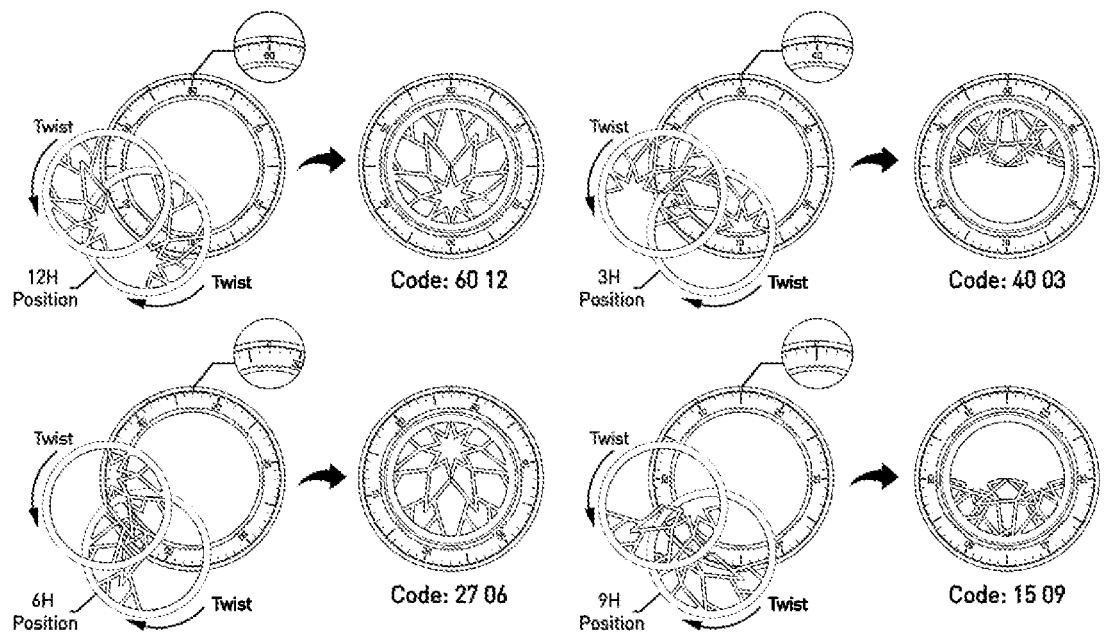
FIG. 9 is an exemplary diagram showing how a recognizable code can be set in one embodiment of the present invention.

In order to increase the safety, the adjustable dial 14 and the top ring pin 30 can be combined to form a two layered code. As shown in FIG. 8 and FIG. 9, the decoding device 28 can scan both the adjustable dial 14 and the top ring pin 20 of the watch 11. Specific patterns of the adjustable dial 14 act as primary codes while the graphic of the top ring pin 30 acts as a secondary code. A specific combination of the primary code and the secondary code forms a recognizable code to be detected by the camera of the decoding device 28. Upon recognition, the decoding device 28 will perform subsequent actions. Referring to FIG. 9, the upper dial 16 and the lower dial 18 can contain markings (not shown in the figure). By twisting the upper dial 16 and the lower dial 18 so that the markings face toward the 12 o'clock position, the pattern of the adjustable dial 14 is recognized as a primary code 12. The top ring pin 30 can also contain a marking (not shown in the figure). By rotating the top ring pin 30 so that the scale 60 is at the 12 o'clock position, the graphic of the top ring pin 30 is recognized as a secondary code 60. Then the primary code 12 and the secondary code 60 form a recognizable code. The decoding device 28 performs the subsequent action only when a primary code 12 and a secondary code 60 are identified, i.e. both the adjustable dial 14 and the top ring pin 30 are at the right position, thereby increasing the security level via a two layered code. Similarly, when the marking of the adjustable dial 14 is rotated to the 3 o'clock position, the primary code is recognized as 03, and so on. When the scale 40 of the top ring pin 30 is at the 12 o'clock positon, the secondary code is recognized as 40, and so on. Different combination of the primary code and the secondary code can be set as a recognizable code by the user using the decoding device 28. The setting is flexible and a unique recognizable code can be defined by every user while maintaining a high safety. The aforesaid recognition algorithm is used in a preferred embodiment. It is clear that other methods or algorithms can be used without departure from the scope of the present invention.

Figure 10:
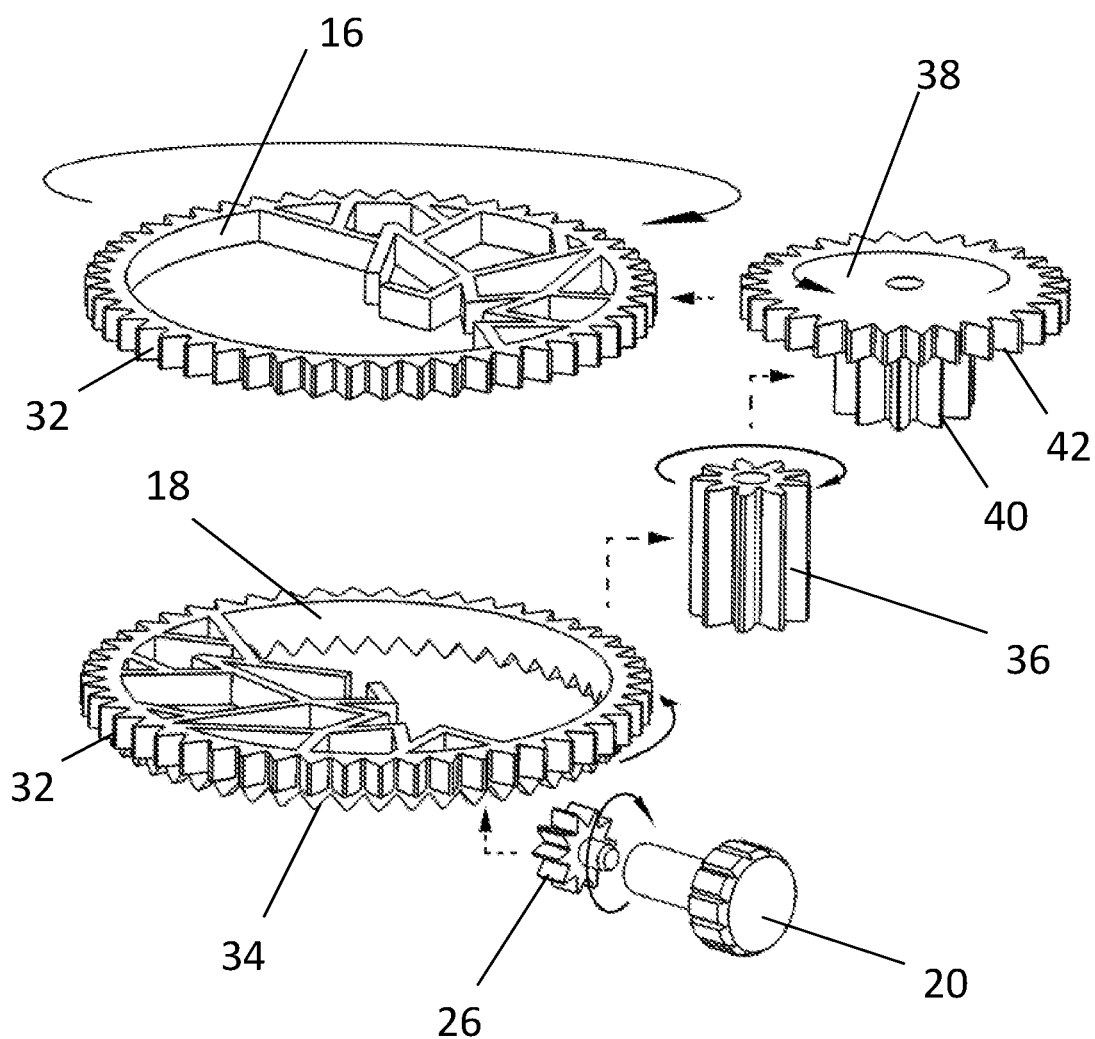
FIG. 10 is a second design of the adjustable dial of the present invention.

Now referring to FIG. 10, it is another design of the adjustable dial. The outer circumferences of both the upper dial 16 and the lower dial 18 comprise side teeth 32. The outer circumference of the lower dial 18 further comprises bottom teeth 34 facing downward. The dial crown 20 comprises a driving wheel 26 having teeth matching with the bottom teeth 34 of the lower dial 18. In this design, a different adjustment mechanism is used. There is a side wheel 36 and a double layer wheel 38. The side wheel 36 has teeth matching with the side teeth 32 of the lower dial 18. The double layer wheel 38 has lower teeth 40 matching with the teeth of the side wheel 36 and upper teeth 42 matching with the side teeth 32 of the upper dial 16.

Figure 11:
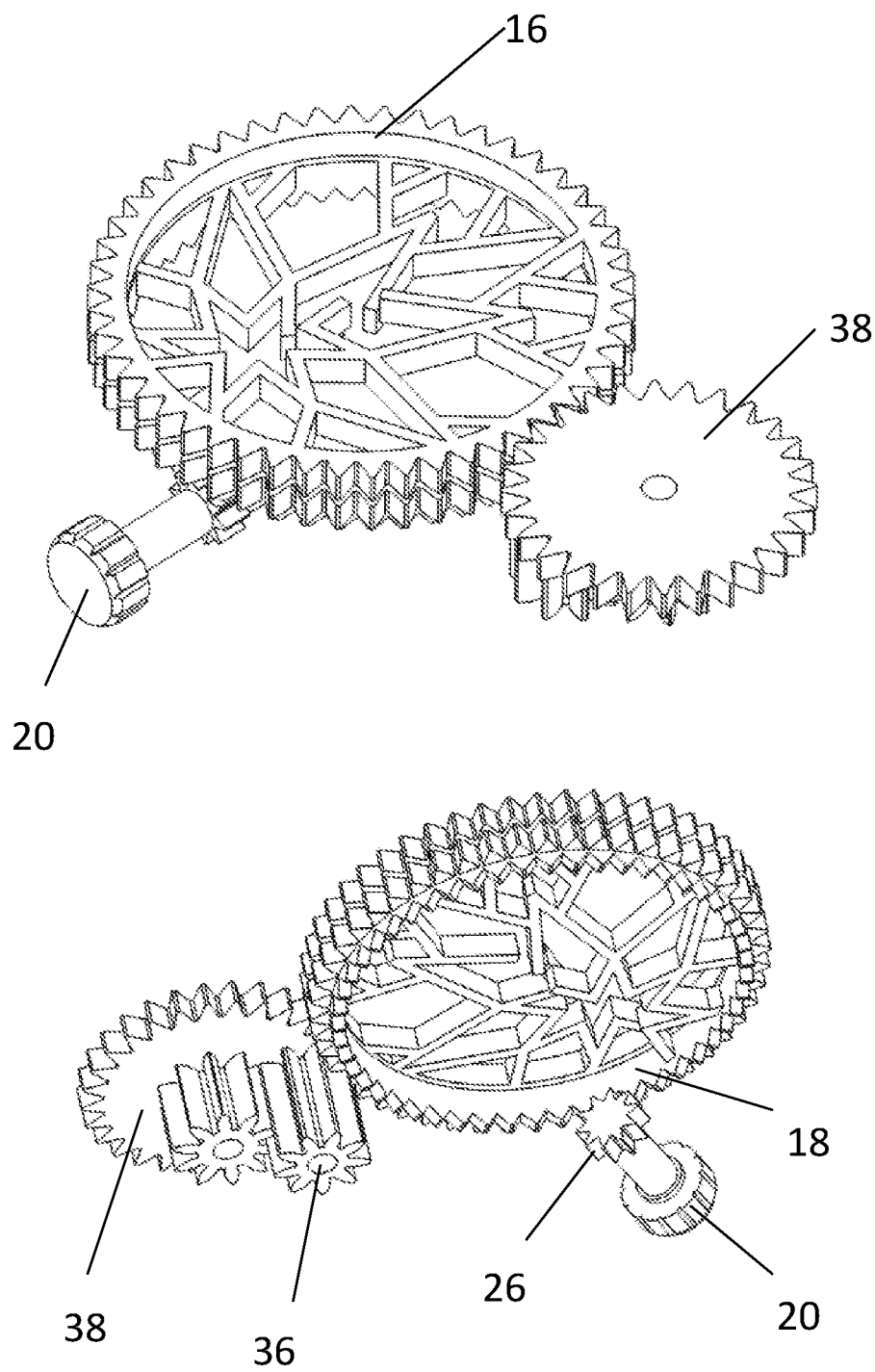
FIG. 11 is an assembled view of the adjustable dial of the second design of the present invention.

FIG. 11 shows an assembled view of the adjustable dial 14, the dial crown 20, the side wheel 36 and the double layer wheel 38. The upper dial 16 is stacked on the lower dial 18. The driving wheel 26 of the dial crown 20 are meshed with the bottom teeth 34 of the lower dial 18. The teeth of the side wheel 36 are meshed with the side teeth 32 of the lower dial 18 and the lower teeth 40 of the double layer wheel 38. The upper teeth 42 of the double layer wheel 38 are meshed with the side teeth 32 of the upper dial 16. By this arrangement, rotation of the dial crown 20 will drive the lower dial 18 and the upper dial 16 to rotate in opposite direction.

Figure 12:
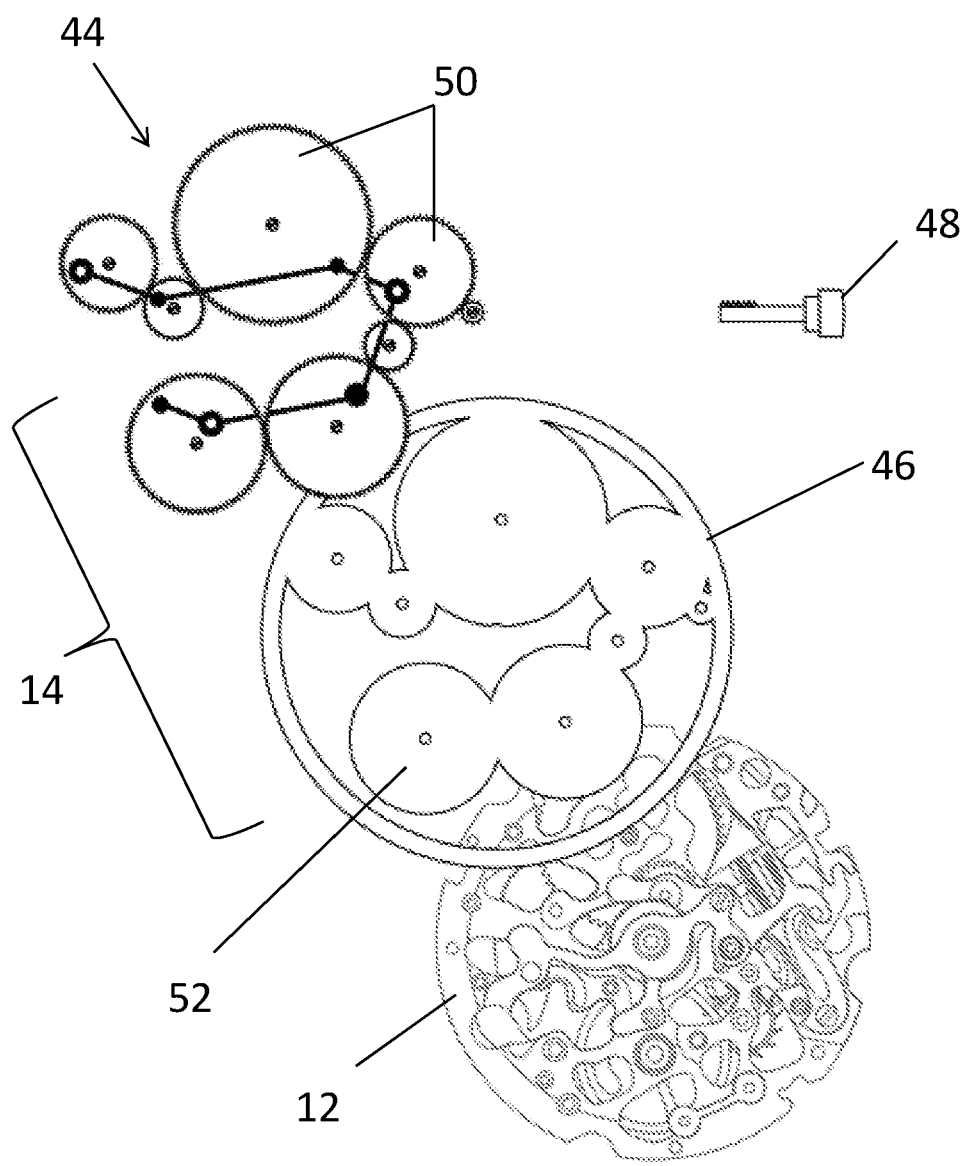
FIG. 12 is a third design of the adjustable dial of the present invention.

In FIG. 12, a third design of the adjustable dial 14 is shown. In this embodiment, the adjustable dial 14 comprises an upper layer 44 and a lower layer 46 placed above the movement 12. The upper layer 44 comprises a plurality of gears 50. The lower layer 46 comprises a frame 52 for supporting the plurality of gears 50. The gears 50 can be of different sizes. The plurality of gears 50 are meshed with each other linearly. Each gear 50 has a shaft at its middle and a graphic thereon. The frame 52 has a shape corresponding to the plurality of gears 50. At the corresponding locations, the frame 52 comprises a plurality of holes for disposing the shafts of the plurality of gears 50. In this design, a pusher 48 is used to adjust the upper layer 44. The pusher 48 has side teeth meshed with one of the gears 50, probably a small gear. As all the gears 50 are meshed with each other linearly, pushing of the pusher 48 drives all gears 50 to rotate. Graphics on the gears 50 change due to the rotation and then constitute different patterns.

Figure 13:
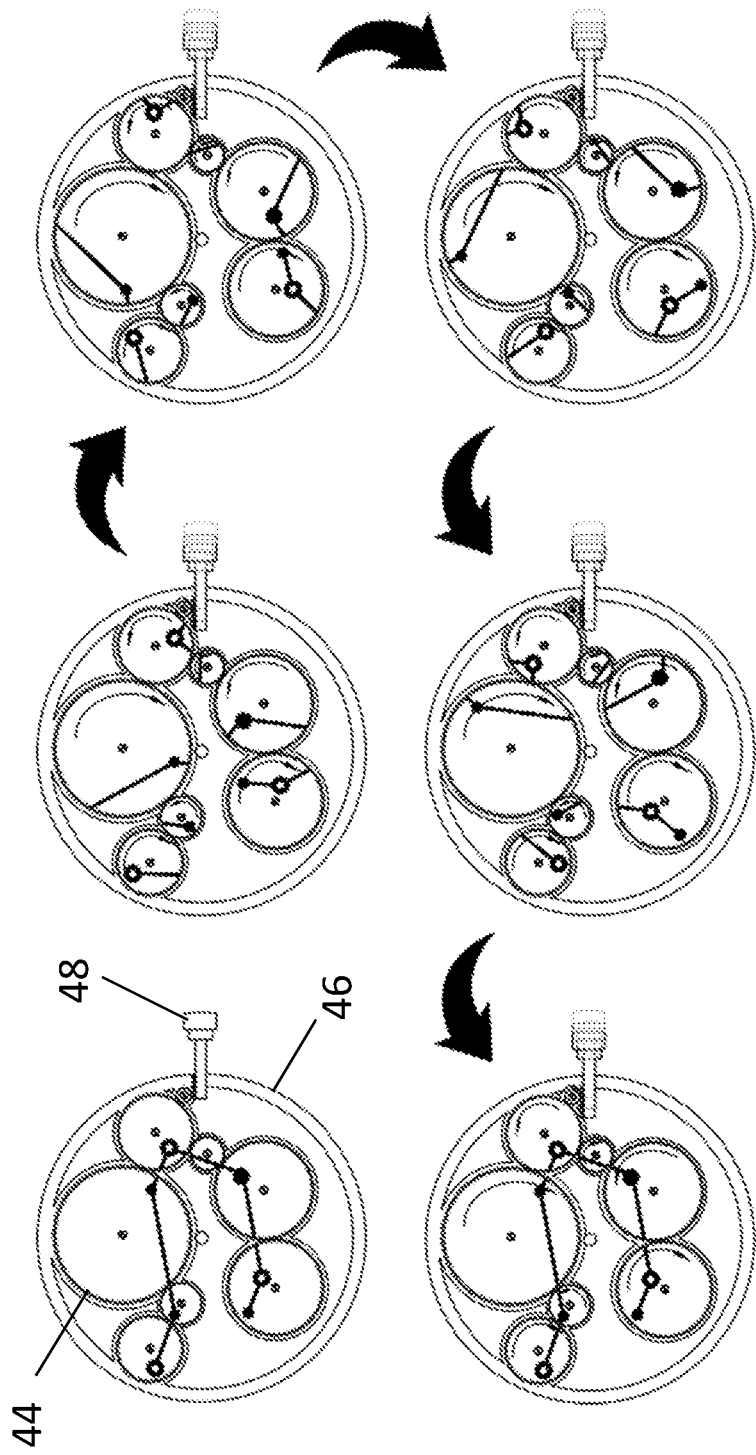
FIG. 13 is an exemplary diagram showing how the adjustable dial of the third design is adjusted.
Figure 14:
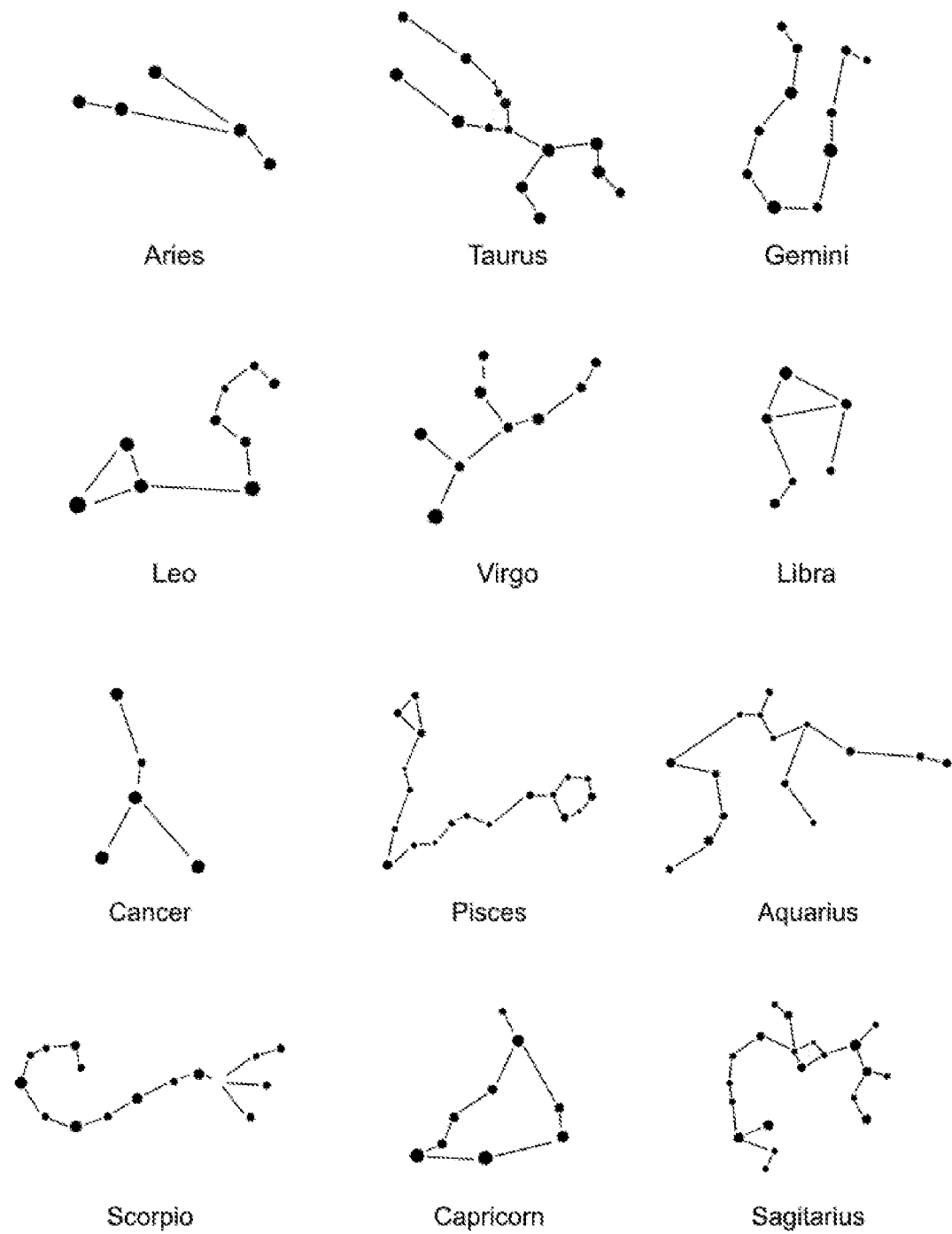
FIG. 14 is the constellation pattern of the graphics on the gears in one embodiment of the present invention.

FIG. 13 shows how the adjustable dial 14 is adjusted. When the pusher 48 is pushed at a time, each gear 50 is rotated at an amount according to its size. The pattern constituted by the graphics of the gears 50 varies by continuously pushing the pusher 48 and finally backs to the original pattern. As shown in FIG. 14, the graphics of the gears 50 can form a constellation such as Aries, Taurus, or Leo, etc. Of course other patterns can be used, depending on the needs and preference.

The designs of the adjustable dial 14 in FIGS. 10 and 12 can be applied to the security system as well. Specific patterns can be set as codes by the users. Two-layered code can be also used to increase the security level.

The exemplary embodiments of the present invention are fully described. Although the description referred to particular embodiments, it will be clear to one skilled in the art that the present invention may be practiced with variation of these specific details. Hence this invention should not be construed as limited to the embodiments set forth herein.

What is claimed is:

1. A watch comprising:
   a movement;
   a case housing the movement; and
   an adjustable dial mounted above the movement;
   wherein the adjustable dial comprises an upper dial and a lower dial, each of the upper dial and the lower dial being coaxially rotatable relative to each other,
   wherein the upper dial has a first pattern, and the lower dial has a second pattern,
   wherein the adjustable dial shows different patterns by rotatably adjusting relative positions of the first pattern on the upper dial and the second pattern on the lower dial.

2. The watch of claim 1 further comprising a dial crown for adjusting the upper dial and the lower dial.

3. The watch of claim 2, wherein outer circumferences of both the upper dial and the lower dial comprise bottom teeth facing downward, the dial crown comprising a driving wheel having teeth matching with the bottom teeth of the upper dial and the lower dial.

4. The watch of claim 3, wherein the upper dial has a larger diameter than the lower dial, the upper dial covering above the lower dial, the bottom teeth of the upper dial and the bottom teeth of the lower dial being at a same horizontal line.

5. The watch of claim 4, wherein the teeth of the driving wheel of the dial crown are meshed with the bottom teeth of the lower dial when pushing in the dial crown, the teeth of the driving wheel of the dial crown being meshed with the bottom teeth of the upper dial when pulling out the dial crown.

6. The watch of claim 3, wherein the case comprises a groove for accommodating the bottom teeth of the upper dial and the lower dial, the groove acting as a rotation orbit of the upper dial and the lower dial.

7. The watch of claim 2, wherein outer circumferences of both the upper dial and the lower dial comprise side teeth, the outer circumference of the lower dial further comprising bottom teeth facing downward, the dial crown comprising a driving wheel having teeth matching with the bottom teeth of the lower dial.

8. The watch of claim 7 further comprising a side wheel and a double layer wheel, the side wheel having teeth matching with the side teeth of the lower dial, the double layer wheel having lower teeth matching with the teeth of the side wheel and upper teeth matching with the side teeth of the upper dial.

9. The watch of claim 8, wherein the driving wheel of the dial crown are meshed with the bottom teeth of the lower dial, the teeth of the side wheel being meshed with the side teeth of the lower dial and the lower teeth of the double layer wheel, the upper teeth of the double layer wheel being meshed with the side teeth of the upper dial, rotation of the dial crown driving the lower dial and the upper dial to rotate in opposite direction.

10. The watch of claim 9, wherein the case comprises a groove for accommodating the bottom teeth of the lower dial, the groove acting as a rotation orbit of the lower dial.

11. The watch of claim 1, wherein the upper dial and lower dial are hollow with first and second patterns occupying half of the hollow area of the upper dial and lower dial.

12. The watch of claim 1 further comprising a top ring pin with graphic thereon, the top ring pin being adjustable by twisting, a combination of the top ring pin and the adjustable dial forming different patterns by adjustment.

13. A security system using the watch of claim 12 as an encoder, comprising a decoding device, wherein specific patterns of the adjustable dial act as primary codes while the graphic of the top ring pin acts as a secondary code, a specific combination of the primary code and the secondary code forming a recognizable code, the decoding device comprising a camera for recognizing the recognizable code and performing subsequent actions upon recognition.

14. The security system of claim 13, wherein the subsequent actions comprises unlocking, payment and identification.

15. The security system of claim 13, wherein the decoding device is a smart phone, a payment device or an electronic door lock.

16. A security system using the watch of claim 1 as an encoder, comprising a decoding device, wherein a specific pattern of the adjustable dial is set as a geometric code, the decoding device comprising a camera for recognizing the geometric code and performing subsequent actions upon recognition.

17. The security system of claim 16, wherein multiple specific patterns are set as geometric codes to be recognized by the decoding device.

18. The security system of claim 16, wherein the subsequent actions comprises unlocking, payment and identification.

19. The security system of claim 16, wherein the decoding device is a smart phone, a payment device or an electronic door lock.

20. The watch of claim 1, A watch comprising:
a movement;
a case housing the movement; and
an adjustable dial above the movement,
wherein the adjustable dial comprises an upper layer and a lower layer, the upper layer comprising a plurality of gears, the lower layer comprising a frame for supporting the plurality of gears,
wherein the plurality of gears mesh with each other linearly,
each gear of the plurality of gears comprises a graphic thereon, and
wherein the plurality of gears of the upper layer show different patterns by adjusting an angular position of the graphic by rotating each of the plurality of gears.

21. The watch of claim 20 further comprises a pusher with side teeth meshed with one gear of the plurality of gears, pushing of the pusher driving all the gear to rotate linearly, thereby showing different patterns.

22. The watch of claim 21, wherein the plurality of gears are of different sizes.

* * * * *